United States Patent
Klinchuch

[15] 3,697,143
[45] Oct. 10, 1972

[54] ELECTROSTATIC GYROSCOPE SUSPENSION SYSTEM

[72] Inventor: John F. Klinchuch, Orange, Calif.

[73] Assignee: North American Rockwell Corporation

[22] Filed: May 21, 1971

[21] Appl. No.: 145,679

[52] U.S. Cl. ........................... 308/10, 74/5
[51] Int. Cl. ............................... F16c 39/06
[58] Field of Search ................... 308/10; 74/5

[56] References Cited

UNITED STATES PATENTS

| | | |
|---|---|---|
| 3,098,679 | 7/1963 | De Boice ............... 308/10 |
| 3,209,602 | 10/1965 | Biderman ............ 308/10 |
| 3,221,563 | 12/1965 | Wing .................... 308/10 |
| 3,262,325 | 7/1966 | Senstad ................ 308/10 |
| 3,262,326 | 7/1966 | Schott .................. 308/10 |
| 3,334,949 | 8/1967 | Atkinson .............. 308/10 |
| 3,338,644 | 8/1967 | Atkinson et al. ..... 308/10 |
| 3,619,014 | 11/1971 | Quick ................... 308/10 |

*Primary Examiner*—L. T. Hix
*Attorney*—L. Lee Humphries, H. Frederick Hamann and Edward Dugas

[57] ABSTRACT

The invention is directed to a suspension system for an electrostatic gyroscope wherein the pulse charges applied to electrode pairs to maintain the gyroscope rotor centered between the electrodes is alternated in polarity so as to minimize the accumulated charge on the rotor.

5 Claims, 7 Drawing Figures

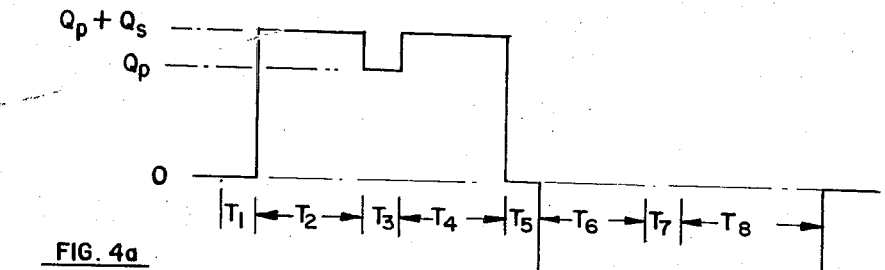
FIG. 4a
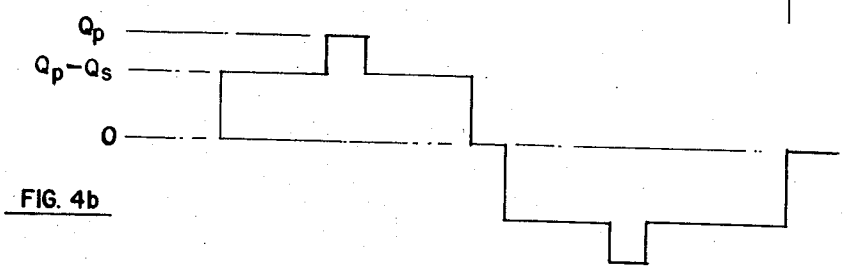
FIG. 4b
TIMING MATRIX
|     | T₁ | T₂ | T₃ | T₄ | T₅ | T₆ | T₇ | T₈ |
|-----|----|----|----|----|----|----|----|----|
| SW1 | 0  | 1  | 1  | 1  | 0  | 0  | 0  | 0  |
| SW2 | 0  | 0  | 0  | 0  | 0  | 1  | 1  | 1  |
| SW3 | 1  | 0  | 0  | 0  | 1  | 0  | 0  | 0  |
| SW4 | 0  | 1  | 0  | 1  | 0  | 0  | 0  | 0  |
| SW5 | 0  | 0  | 0  | 0  | 0  | 1  | 0  | 1  |
| SW6 | 1  | 0  | 0  | 0  | 1  | 0  | 0  | 0  |
| r₁  | 0  | 0  | 1  | 0  | 0  | 0  | 0  | 0  |
| r₂  | 0  | 0  | 0  | 0  | 0  | 0  | 1  | 0  |
1 = CLOSED SWITCH
0 = OPEN SWITCH
T₁ THROUGH T₈ ARE DEFINED IN FIG. 2
FIG. 5
INVENTOR
JOHN F. KLINCHUCH
BY
Edward Dugas
ATTORNEY

ELECTROSTATIC GYROSCOPE SUSPENSION SYSTEM

BACKGROUND OF THE INVENTION

The present invention relates to a system for electrostatically supporting an electrically conductive member in space and, more particularly, to a frictionless support means for supporting the rotor of a gyroscope using alternating polarity pulse amplitude signals which are supplied to supporting electrodes to centrally locate the gyroscope rotor between the electrodes and to provide output signals which indicate the displacement of the rotor with respect to the supporting electrodes.

For background information, an electrostatic gyroscope is a free-rotor gyroscope in which spherical-bearing support forces are derived from an electric field. The rotor is generally an aluminum or beryllium sphere which may be either solid or hollow. The electrostatic support consists generally of pairs of spherical segment electrodes dispersed about the rotor.

Prior known devices for electrically supporting a rotor of a gyroscope are disclosed, for example, in U. S. Patent Application, Ser. No. 50,604, entitled "ELECTROSTATIC SUPPORT SYSTEM," by J. L. Atkinson. In that application there is disclosed an electrostatic gyroscope of the aforementioned type and further including a periodic signal source for providing a squarewave reference signal with a pair of amplifiers connected to the electrodes of a pair with each amplifier receiving the periodic signal as an input. A differential amplifier is connected across the pair of electrodes to provide an output signal proportional to the voltage difference between the electrodes and the supported conductive member. Switch means are utilized to increase or decrease the gain of one amplifier while decreasing or increasing, respectively, the gain of the other amplifier in response to the difference signal so as to increase the magnitude of the periodic signal applied to one electrode and to decrease the magnitude of the periodic signal applied to the other electrode so as to help coerce the electrically supported conductive member towards a centered position.

Other known devices are disclosed, for example, in U.S. Pat. No. 3,098,679, issued July 23, 1963, entitled "PASSIVE CONTROL CIRCUIT FOR ELECTROSTATIC BEARING", by W. F. DeBoice, and U. S. Pat. No. 2,919,583, issued Jan. 5, 1960, entitled "MAGNETICALLY SUPPORTED GYROSCOPE", by H. M. Parker. An additional patent of interest is U. S. Pat. No. 3,338,644, issued Aug. 29, 1967, entitled "ELECTROSTATIC SUPPORT CIRCUIT," by J. L. Atkinson, et al., which patent is assigned to North American Rockwell Corporation, the assignee of the present application.

The main problems encountered with prior art systems are the following:

1. Providing a good separation between the signals used to measure rotor displacement and those used to apply force on the rotor. The suspension system described in this application has been proven by laboratory tests to provide improved separation from the system described in U. S. Pat. No. 3,338,644;
2. the limited g capability of systems similar to those described in U. S. Patent Application, Ser. No. 50,604;
3. the sensitivity of drift rate changes to charge trapped on the rotor for systems which do not periodically change the polarity of the charge applied to each electrode; and
4. providing an accurate determination of force applied to the gyroscope rotor so as to permit the use of the electrostatic gyroscope as an accelerometer.

The present invention provides an improvement in each of these areas over prior art systems. In addition, applicants' alternating polarity charge system reduces the drift rate between rotor lift-offs from 3° per hour to 0.03° per hour.

SUMMARY OF THE INVENTION

According to one aspect of the invention, there is provided an electrostatically supported gyroscope in which a conductive ball is supported between pairs of electrodes and a suspension system which utilizes a plurality of difference amplifiers for sensing the voltage difference between electrodes of a pair. Connected to receive the outputs of the difference amplifiers are sample and hold means which sample the output of the difference amplifiers each positive and negative period of the difference signal and store the samples. Difference means are used to invert one sample of the stored signal and to add the inverted sample to the non-inverted sample. The summed signal from the difference means is proportional to the displacement of the ball with respect to an electrode pair. The displacement signal is then servo-compensated and fed to a charge means through switching means to apply a charge to the electrodes in a direction and with a force adequate to restore the ball to a centered position between the electrodes.

It is, therefore, an object of the present invention to provide an improved system for suspension of an electrically conductive ball.

It is another object of the present invention to provide an electrostatic suspension system for a rotating ball which suspension system minimizes drift rate sensitivity to charges trapped on the rotor.

Another object of the present invention is to provide an improved alternating pulse amplitude suspension system for an electrostatic gyroscope.

The foregoing objects of the present invention will become more apparent and better understood when taken in conjunction with the following description and accompanying drawings, throughout which like characters indicate like parts and which drawings form a part of this application.

BRIEF DESCRIPTION OF THE DRAWINGS

FIGS. 4a and 4b are waveforms useful in understanding the operation of the preferred embodiment of FIGS. 3a and 3b; and FIG. 5 is a chart illustrating the switching times of a switching means used in the preferred embodiment of FIGS. 3a and 3b.

DESCRIPTION OF THE PREFERRED EMBODIMENT

Figure 1:
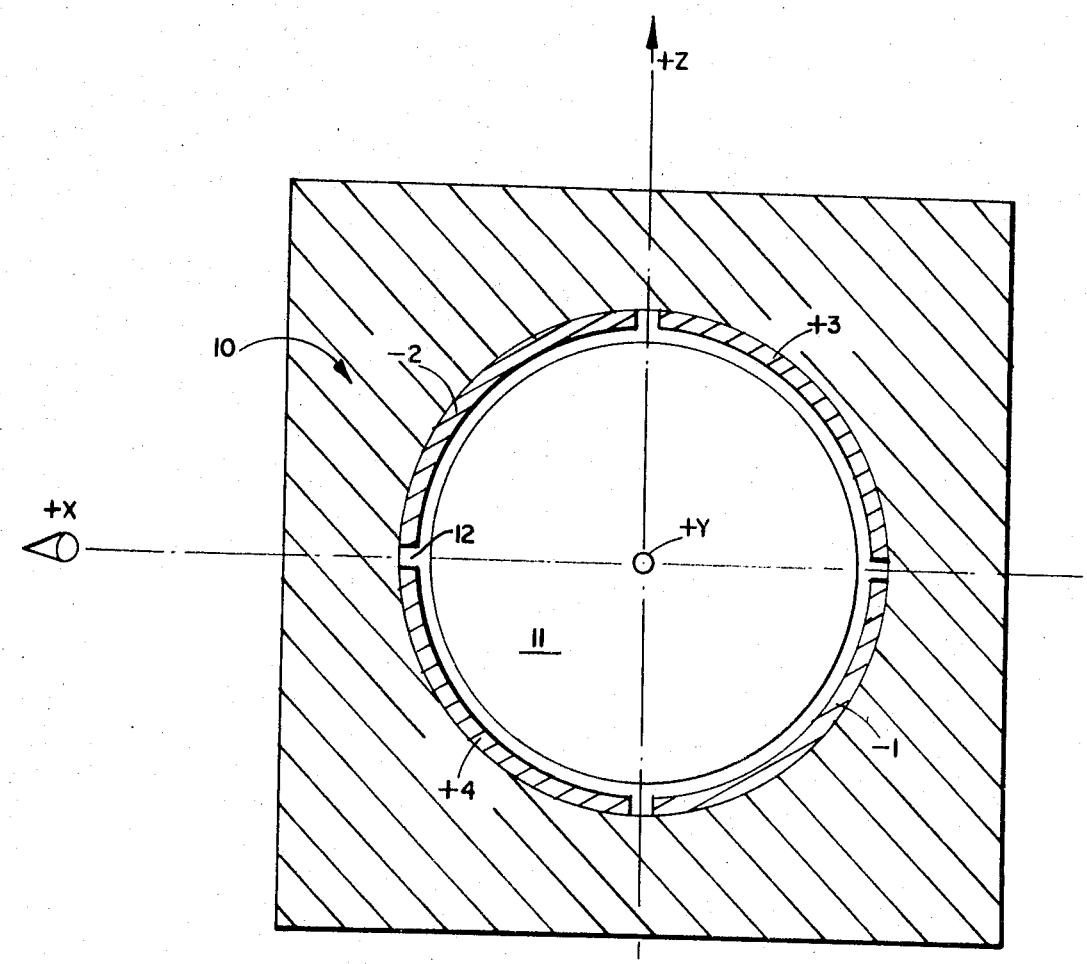
FIG. 1 illustrates in a sectioned view an electrically conductive ball rotor positioned for levitation between a plurality of electrodes.
Figure 2:
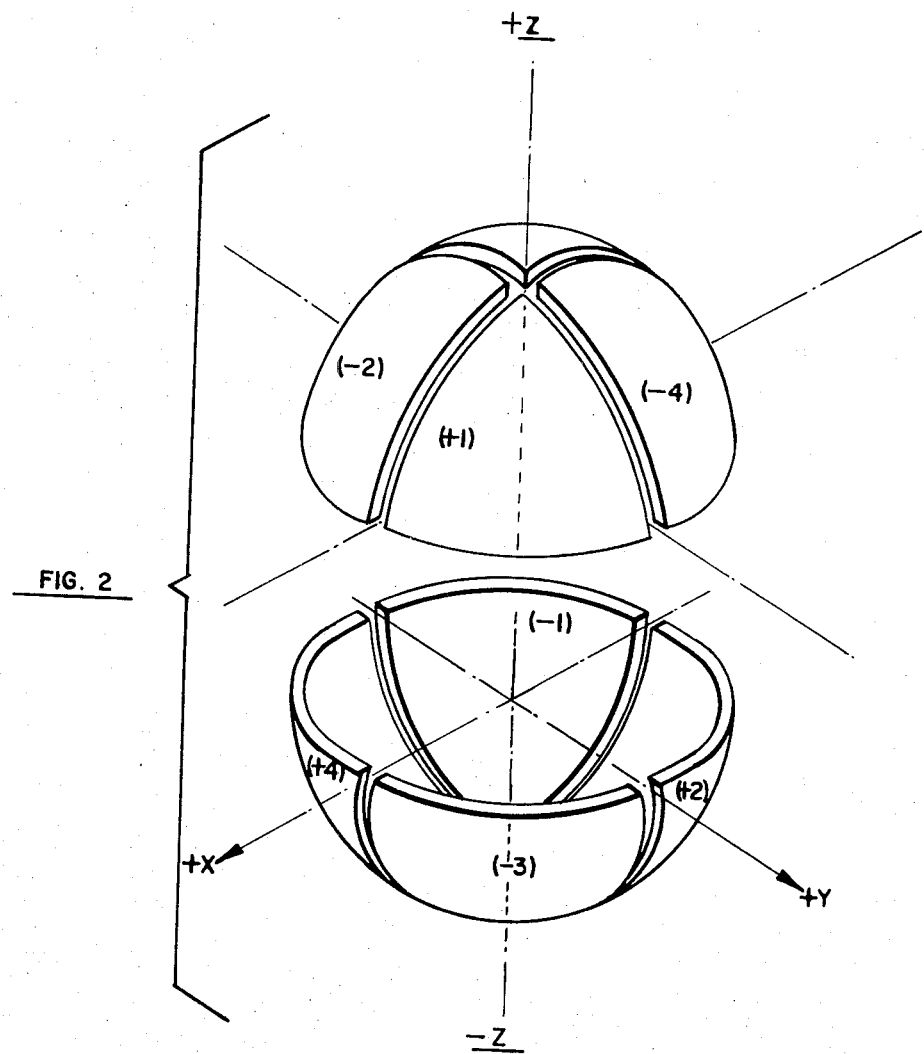
FIG. 2 illustrates in an exploded view the positioning and shape of the levitating electrodes used with the preferred embodiment of the invention.

FIGS. 1 and 2 show schematically a gyroscope comprised of a non-conductive ceramic case 10 with a spherical interior contour and an electrically conductive surface ball 11 which may or may not be spun as a rotor to act as a gyroscope. Within the case 10 is a spherical cavity 12 lined with eight octantal electrodes, shown as seen from the outside, in FIG. 2, which are denoted for convenience in analysis at +1 −1, +2 −2, +3 −3, and +4 −4. Each pair, e.g., +1 −1, are diemetrically opposed. The electrode surfaces may be thought of as a projection upon a sphere of the eight faces of a regular octahedron. The axes of the electrodes set are then taken as X, Y and Z in FIG. 2. The X and Z axes define the plane along which a section is taken for FIG. 1. A vacuum exists within the spherical cavity 12.

Each pair of electrodes, e.g., +1 −1, are connected into a suspension means, to be described, such that the departure of the ball 11 from the center of the spherical cavity 12, which, for example, decreases the gap at +1 and increases it at −1, results in a voltage decrease and increase, respectively, to center the ball.

Figure 3A:
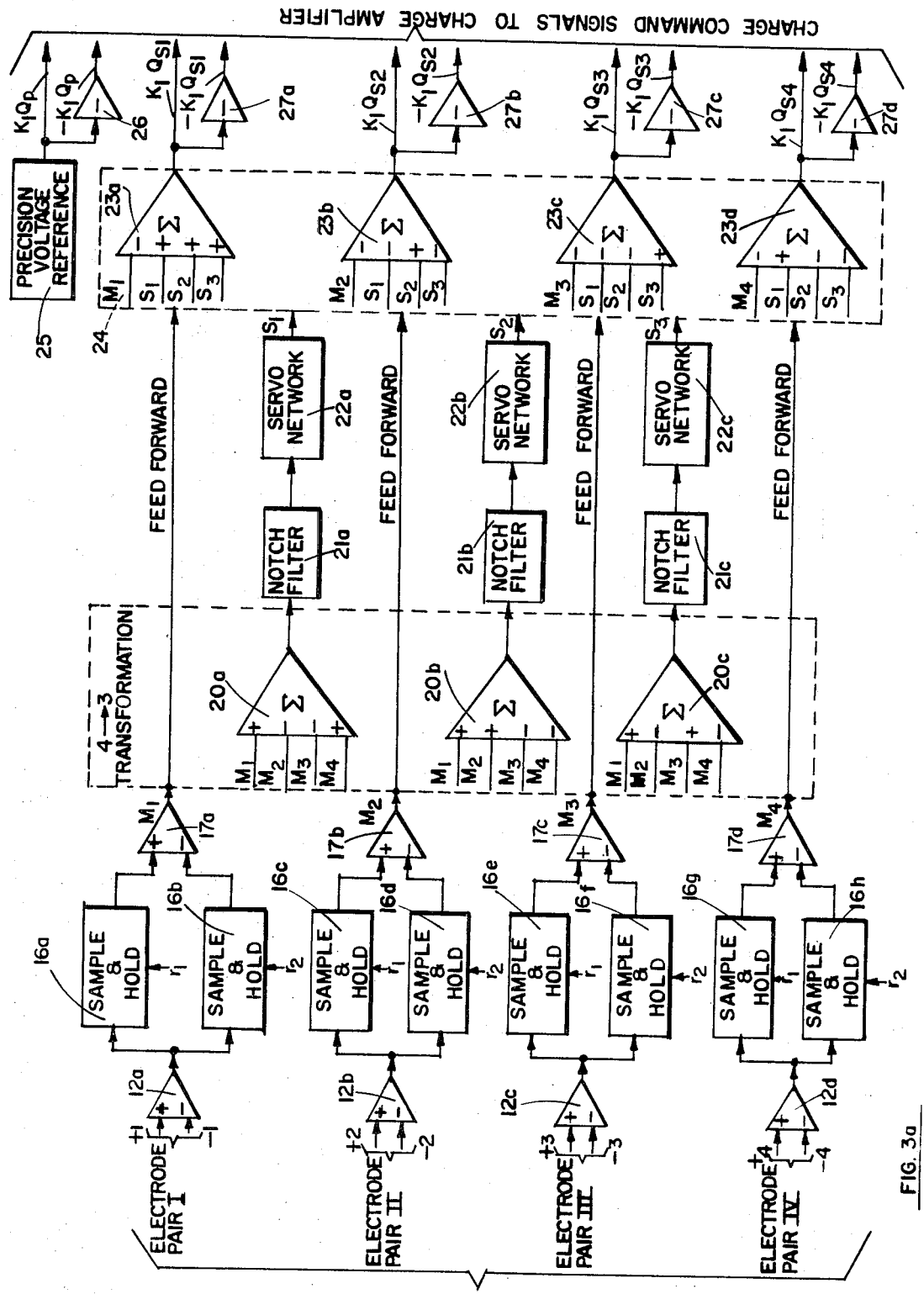
FIGS. 3a and 3b which connect end to end illustrate in block diagram form the preferred embodiment of the invention.
Figure 3B:
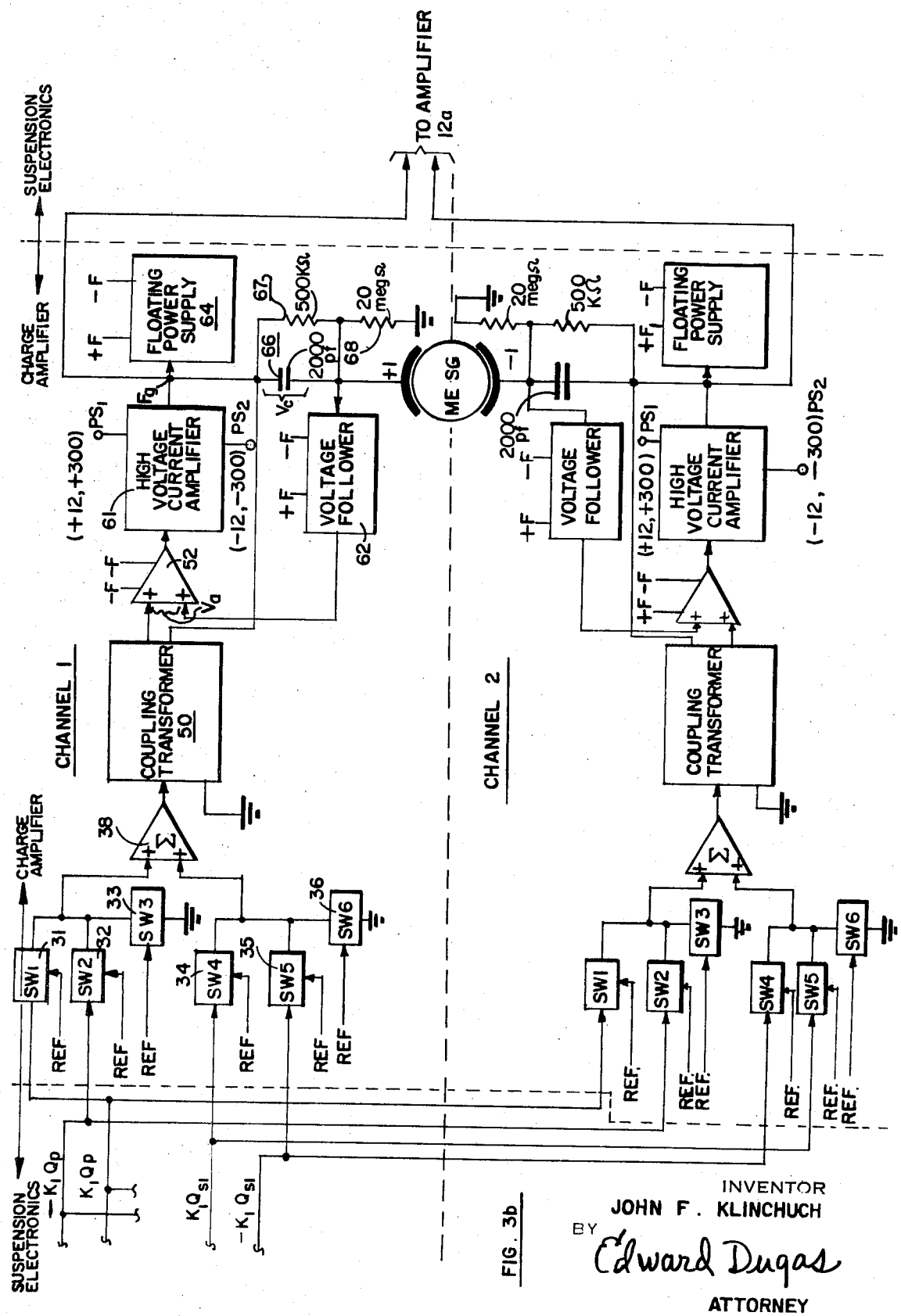

Referring now to FIG. 3a, in conjunction with FIG. 3b, and the timing matrix of FIG. 5, four difference amplifiers, labeled 12a to 12d, are each connected to a pair of electrodes, +1 −1, +2 −2, +3 −3, and +4 −4, respectively. The +1 −1 electrodes are pair I. Electrodes +2 −2 form pair II with electrodes +3 −3 forming pair III and electrodes +4 −4 forming pair IV. The output of these difference amplifiers are fed to pairs of sample and hold means 16a 16b; 16c 16d; 16e 16f; 16g 16h, respectively. One sample and hold means of a pair receives a reference signal $r_1$ with the other sample and hold means of the pair receiving the reference signal $r_2$. Reference signal $r_1$ causes sample and hold means 16a, 16c, 16e and 16g to store the difference between the voltages at electrode pairs during the time period $T_3$. Reference signal $r_2$ causes sample and hold means 16b, 16d, 16f and 16h to store the difference between electrode pairs during the time period $T_7$.

FIGS. 4a and 4b illustrate by waveforms that the magnitude of the charge applied to the electrodes during the time period $T_3$ or $T_7$ is always equal to the preload charge $Q_p$ which is a constant. The displacement of the rotor 11 within the cavity 12 can be electrically determined for plate pair 1 and −1 by use of the following equations:

$$V_1 = \frac{Q_p}{C_1} \approx \frac{Q_p}{C_0}\left(1+\frac{X_1}{h}\right) \quad \text{Eq. (1)}$$

$$V_{-1} = \frac{Q_p}{C_{-1}} \approx \frac{Q_p}{C_0}\left(1-\frac{X_1}{h}\right) \quad \text{Eq. (2)}$$

$$V_1 - V_{-1} = \frac{2Q_p}{C_0 h} X_1 = K X_1 \quad \text{Eq. (3)}$$

where $V_1$ = voltage at electrode 1;
$V_{-1}$ = voltage at electrode −1;
$C_0$ = capacitance between the rotor and electrode when the rotor is centered;
$C_1$ = capacitance between the rotor and electrode 1;
$C_{-1}$ = capacitance between the rotor and electrode −1;
$X_1$ = displacement of the rotor from the cavity center along axis 1;
$h$ = nominal gap between the rotor and the electrodes; and $$K = \text{constant} = \frac{2Q_p}{C_0 h}$$

Equation (3) shows that the voltage difference between opposite electrodes is proportional to rotor displacement $X_1$. Each pair of sample and hold means has its output connected to one input of the difference amplifiers 17a, 17b, 17c or 17d. The output of the difference amplifiers are labeled $m_1$, $m_2$, $m_3$ and $m_4$, respectively. It is necessary to sample the signals at the outputs of difference amplifiers 12 using pairs of staggered gated sample and hold means in the manner previously described because the polarity of the difference signal during sample period $T_3$ is opposite from the polarity of the difference signal during period $T_7$. The signals from the difference amplifiers 17 are fed to a 4:3 signal transformation circuit 19, comprised of summation amplifiers 20a, 20b, and 20c. The transformation circuit changes the four input signals into signals corresponding to the signals along orthogonal axes X, Y and Z, respectively. The transformation converts four dependent pickoff signals to a set of three independent signals. This prevents saturation of the suspension electronics when pickoff offset voltages occur. The suspension electronics gain is extremely high at low frequency and very small offset voltages will saturate these electronics if the channels are not independent. A high gain at low frequency is required in order to maintain the average position of the rotor at the center of the cavity in the presence of gravity forces acting on the rotor. An average displacement of the rotor from the center of the cavity results in drift rate and attitude readout errors. Signals from the summation amplifiers 20 are then fed to corresponding notch filters 21a, 21b, and 21c, respectively, and from there to servo networks 22a, 22b and 22c, respectively. Each of the servo networks operate to provide servo compensation for the suspension electronics which compensation stabilizes the system according to well-known servo feedback methods. The notch filters provide the necessary filter characteristics for rotor speed control similar to the type described in U.S. Patent Application, Ser. No. 77,993, entitled "Speed Control," by J. Boltinghouse et al. The output of the servo networks along with the outputs from difference amplifiers 17a through 17d are fed to summation amplifiers 23a through 23d. Summation amplifiers 23a through 23d form a 3:4 signal conversion means 24 to reconvert the signals received at the amplifiers' inputs back into the four coordinate systems. The outputs from amplifiers 23a through 23d are each available in a positive value and a negative value as a result of being processed through inverting amplifiers 27a through 27d. A precision voltage reference 25 provides a constant signal $K_1 Q_p$ and the negative value of this constant signal $-K_1 Q_p$, by means of inverting amplifier 26.

The charges which suspend the ball between the electrodes are applied to the electrodes by the system shown in FIG. 3. The operation of the charge channel 1 for electrode +1 will be explained. Electrode +1 is services through channel 1 with electrode −1 services through channel 2. Each channel is identical in construction and will hereinafter be referred to as charge channels. The operation of the charge channel for all other electrodes being identical to the operation of the charge channel for electrode +1.

The charge applied to channel 1 is proportional to the voltage applied to amplifier 38. The input voltage to amplifier 38 is controlled by applying voltages $K_1 Q_p$, $-K_1 Q_p$, $K_1 Q_{s1}$, and $-K_1 Q_{s1}$ through switches 31, 32, 33, 34, 35 and 36. The opening and closing times of these switches appear in FIG. 5 in the timing matrix diagram. The output signal from amplifier 38 is fed to a coupling transformer 50. The coupling transformer operates to isolate the low level signal from amplifier 38 from the high voltage potentials that are applied to the electrodes. The secondary of transformer 50 is connected at one terminal to the input of amplifier 52. The other transformer secondary terminal is connected to the junction of resistor 67, capacitor 66, and the input to a floating power supply 64. The secondary of the coupling transformer applies a voltage, $V_a$, with respect to floating ground, $F_g$, to amplifier 52. This amplifier will cause the high voltage amplifier 61 to drive a current through capacitor 66 until the voltage $V_c$ across the capacitor 66 equals $V_a$. The voltage follower 62 is a very high input impedance amplifier. Therefore, all current passing through capacitor 66 is applied to electrode +1 except for the small leakage current through resistor 68. Thus, the amplifier 52 serves to control the charge applied to the electrode, since the charge on electrode +1 is equal to the charge on capacitor 66. When the rotor 11 is centered, the time constant of capacitor 66 and resistor 67 is identical to the time constant of the electrode capacitance and resistor 68. For this condition, the leakage through resistor 68 is compensated for by the leakage through resistor 67, giving a net leakage of zero current to the electrode. Resistor 68 is necessary to prevent charge accumulation errors due to minute leakage currents which may exist. The floating power supply furnishes power to the voltage follower 62 and amplifier 52. This allows the use of low power, low voltage, high bandwidth integrated circuits. The ground reference for these devices is, $F_g$, which follows the electrode potential.

No charge is applied to the electrodes during time periods $T_1$ and $T_5$. This is to allow the high voltage power supplies, which drive the high voltage current amplifier 61 to change state. When electrode +1 has a positive polarity of preload charge, $Q_p$ applied, the high voltage supplies have +300 VDC applied to $PS_1$, and $-12$ VDC applied to $PS_2$. When the electrode has a negative polarity of preload charge, $Q_p$, applied, the high voltage supplies have +12 VDC applied to $PS_1$ and $-300$ VDC applied to $PS_2$. Switching the high voltage supplies in this manner reduces the sustaining voltage requirements for the transistors used in the high voltage current amplifier 61.

FIG. 4a illustrates the waveform present on electrode +1 for one complete cycle, while FIG. 4b illustrates the waveform present on electrode -1 for one complete cycle.

The times, T, are set forth, for the preferred embodiment, as follows:

$T_1 = 5$ microseconds
$T_2 = 15$ microseconds
$T_3 = 10$ microseconds
$T_4 = 20$ microseconds
$T_5 = 5$ microseconds
$T_6 = 15$ microseconds
$T_7 = 10$ microseconds
$T_8 = 20$ microseconds
$T_9 = 100$ microseconds The preload charges for electrode pairs I and III are in time phase and are 180° out of phase with the preload charges for electrode pairs II and IV.

The net force exerted on the rotor along an axis extending from the center of the cavity 12 through the center of electrode +1 is proportional to the amplitude of, $K_1 Q_{s1}$. The periods in which a net force is exerted on the rotor are $T_2$, $T_4$, $T_6$ and $T_8$ as shown in FIGS. 4a and 4b. The force produced by electrode +1 along its central axis during periods $T_2$, $T_4$, $T_6$ and $T_8$ is described by the following equations:

$$F_{n1} = F_1 = F_{-1} \qquad \text{Eq. (4)}$$

$$F_1 = K_3(Q_p + Q_{s1})^2 \qquad \text{Eq. (5)}$$

$$F_{-1} = K_3(Q_p - Q_{s1}) \qquad \text{Eq. (6)}$$

$$F_{n1} = 4K_3 Q_p Q_{s1} = K_4 Q_{s1} \qquad \text{Eq. (7)}$$

where $F_{n1}$ = net force along electrode +1 axis;
$F_1$ = force applied by electrode 1;
$F_{-1}$ = force applied by electrode -1;
$K_3$ = constant relating charge to force;
$Q_p$ = preload charge which is a constant; and
$Q_{s1}$ = variable charge proportional to $K_1 Q_{s1}$.

Equation (7) shows that the force produced along the center axis of electrode +1 is proportional to the servo command signal, $K_1 Q_{s1}$.

In summary, by applying alternating polarity pulse amplitude signals to the electrodes of an electrostatically supported conductive rotor, it is possible to minimize the charges trapped on the conductive rotor, thereby increasing the accuracy with which the rotor's position with respect to the electrodes is determined.

While there has been shown what is considered to be the preferred embodiment of the present invention, it will be manifest that many changes and modifications may be made therein without departing from the essential spirit of the invention. It is intended, therefore, in the annexed claims, to cover all such changes and modifications as fall within the true scope of the invention.

I claim:

1. A suspension system for an electrostatic gyroscope of the type which incorporates pairs of electrodes arranged in a symmetrical array around a conductive ball, which ball is adapted to be spun about a spin axis, and wherein said suspension system is comprised of:

a plurality of difference amplifier means for sensing the voltage difference between electrodes of a pair and said conductive ball and providing a signal proportional to the voltage difference;

sample and hold means for sampling the output of the difference amplifier each positive and negative period of the difference signal and for holding said samples;

difference means for inverting one sample of said held signal and for summing the inverted sample with the non-inverted signal to provide a signal proportional to the displacement of the ball with respect to the electrode pair;

means for receiving the output signals from said difference means and for applying servomechanism compensation to said signals;

charge means for alternately applying potentials to the electrodes of a pair in response to a control signal;

a source of constant amplitude alternate polarity signals; and switch means for receiving the signals from said difference means and for periodically providing said signals to said charge means as said control signal and, in addition, for periodically connecting the input of said charge means to said constant alternate polarity signals so as to remove charge build-ups from said conductive ball.

2. The system according to claim 1 wherein said switch means also periodically connects the input of said charge means to a reference potential.

3. A suspension system for an electrostatic gyroscope of the type which incorporates pairs of electrodes arranged in a symmetrical array around a conductive ball, which ball is adapted to be spun about a spin axis, and wherein said suspension system is comprised of:

means for sensing the voltage difference between electrodes of a pair and said conductive ball and for providing a signal proportional to this difference;

means for digitally comparing the difference between positive and negative periods of said difference signal to provide a displacement signal;

charge means for selectively applying potentials to the electrodes of a pair in response to control signals;

control means responsive to said displacement signal for applying a control signal to said electrodes in alternating polarity to position the conductive ball so as to minimize said displacement signal;

a source of constant amplitude alternate polarity signals; and means for periodically connecting said control means to said source of constant amplitude alternating polarity signals so as to apply said constant amplitude signal to said electrodes so as to diminish the charge accumulation on said conductive ball.

4. The suspension system according to claim 1 wherein said charge means is comprised of:

a floating power supply having an output and an input, the output level of which varies in accordance with the potential applied at its input;

amplifier means powered by said floating power supply for receiving the servomechanism compensated output signals, said amplifier means amplifying said compensated signal;

a current amplifier means for receiving the signal from said amplifier means and for providing said amplified signal in the form of a potential to the input of said floating power supply;

a voltage follower means powered by said floating power supply having its input connected to the electrode side of said capacitor means and its output connected to an input of said amplifier means so as to feed back to said amplifier means the potential in said electrode; and resistor means connected across said capacitor means and to a reference potential.

5. A suspension system for an electrostatic gyroscope of the type which incorporates pairs of electrodes arranged in a symmetrical array around a conductive ball, which ball is adapted to be spun about a spin axis, and wherein said suspension system is comprised of:

a plurality of difference amplifier means for sensing the voltage difference between electrodes of a pair and said conductive ball, and providing a signal proportional to said voltage difference;

a plurality of sample and hold means, one connected to the output of each difference of said difference amplifier each positive and negative period of the difference signal and for holding said samples;

difference means for providing a displacement signal which is the sum of the positive and negative periods of the difference signal from said sample and hold means indicating the displacement of the conductive ball between the pair of electrodes;

signal transformation means for receiving the displacement signals from said displacement means and for transforming said displacement signals into signals corresponding to the displacement of said conductive ball along three mutually orthogonal axes;

servomechanism compensation means for compensating said displacement signals so as to remove undesired portions of said signals;

charge means for alternately applying potentials to the electrodes of a pair in response to a control signal;

a source of constant amplitude alternate polarity signals; and switch means for receiving the signals from said difference means and for periodically providing said signals to said charge means as said control signal and, in addition, for periodically connecting the input of said charge means to said constant alternate polarity signals so as to remove charge build-ups from said conductive ball.

* * * * *